UNITED STATES PATENT OFFICE.

CONRAD POPPENHUSEN, OF HAMBURG, GERMANY.

MOLDING ARTICLES OF INDIA-RUBBER AND OTHER VULCANIZABLE GUMS.

SPECIFICATION forming part of Letters Patent No. 256,043, dated April 4, 1882.

Application filed December 14, 1881. (No specimens.) Patented in Germany January 11, 1881.

*To all whom it may concern:*

Be it known that I, CONRAD POPPENHUSEN, a citizen of the United States, temporarily residing at Hamburg, in the Empire of Germany, have invented a certain new and useful Improvement in Molding Articles of India-Rubber and other Vulcanizable Gums, of which the following is a specification.

In molding articles of india-rubber or other vulcanizable gums it is extremely difficult to prevent air from remaining between the compound to be vulcanized and the walls of the mold, and when present, even in small quantities, the air is very detrimental to the manufacture of such articles.

The object of this invention is to remedy this defect; and to this end the invention consists in first filling the mold with a liquid—such, for example, as linseed-oil—to displace or exclude all air therefrom, and in pressing the compound of india-rubber or other gum prepared for vulcanization into the mold, thereby displacing the liquid and enabling the mold to be entirely filled with the compound without the liability of any air remaining.

In carrying out my invention the compound is prepared in the usual way, and I make use of any liquid which will not damage the manufacture if portions thereof remain in the mold, and which will, at least to a certain extent, combine with the compound.

I have found linseed-oil to answer well for the purposes of this invention, as the compound will suck up or absorb the oil, and any small particles of oil which may remain between the inner walls of the mold and the compound will combine with the compound before or during the process of vulcanization.

The liquid may either be run into the cavity of the mold, or the mold may be immersed in the liquid contained in a suitable vessel, and in either case the liquid is displaced from the cavity in the mold as fast as the compound is pressed into it.

What I claim as my invention, and desire to secure by Letters Patent, is—

1. The method of molding articles of india-rubber or other vulcanizable gum, consisting in filling the mold with liquid to exclude all air therefrom and displacing the liquid by pressing the compound into the mold so filled, substantially as and for the purpose herein described.

2. The method of molding articles of india-rubber or other vulcanizable gum, consisting in filling the mold with linseed-oil to exclude all air therefrom and displacing the liquid by pressing the compound into the mold so filled, substantially as described.

CONRAD POPPENHUSEN.

Witnesses:
F. ENGEL,
F. CLAIRMONT.